(12) United States Patent
Notermans

(10) Patent No.: US 9,074,740 B2
(45) Date of Patent: Jul. 7, 2015

(54) BACKLIGHT STRUCTURE AND DISPLAY MODULE USING THE SAME

(75) Inventor: Jef Notermans, The Netherlands (NL)

(73) Assignee: INNOLUX CORPORATION, Miao-Li County (TW)

( * ) Notice: Subject to any disclaimer, the term of this patent is extended or adjusted under 35 U.S.C. 154(b) by 276 days.

(21) Appl. No.: 13/175,374

(22) Filed: Jul. 1, 2011

(65) Prior Publication Data

US 2013/0002976 A1  Jan. 3, 2013

(51) Int. Cl.
*G02F 1/1333* (2006.01)
*F21S 8/00* (2006.01)
*F21V 21/00* (2006.01)
*F21V 8/00* (2006.01)
*G02F 1/1335* (2006.01)

(52) U.S. Cl.
CPC . *F21S 8/00* (2013.01); *F21V 21/00* (2013.01); *G02F 1/1336* (2013.01); *G02F 2001/133317* (2013.01); *G02B 6/0088* (2013.01); *G02F 1/13338* (2013.01); *G02F 1/133308* (2013.01); *G02F 2001/133322* (2013.01); *G02F 2202/28* (2013.01)

(58) Field of Classification Search
None
See application file for complete search history.

(56) References Cited

U.S. PATENT DOCUMENTS

| | | | | |
|---|---|---|---|---|
| 8,670,085 | B2 * | 3/2014 | Jean et al. | 349/58 |
| 8,876,358 | B2 * | 11/2014 | Park et al. | 362/633 |
| 2005/0280750 | A1 | 12/2005 | Cho et al. | |
| 2008/0030646 | A1 * | 2/2008 | Go | 349/62 |
| 2009/0079894 | A1 * | 3/2009 | Okuda | 349/58 |
| 2010/0045891 | A1 * | 2/2010 | Oh | 349/58 |
| 2012/0069261 | A1 * | 3/2012 | Lee et al. | 349/58 |

* cited by examiner

*Primary Examiner* — Tina Wong
(74) *Attorney, Agent, or Firm* — Rabin & Berdo, P.C.

(57) ABSTRACT

A backlight structure is provided. The backlight structure includes a backlight unit and a casing. The backlight unit configured to provide light to a display panel. The casing has a base portion and a support portion. The base portion surrounds the backlight unit. The support portion is connected to the base portion, and overlaps with part of the backlight unit. The support portion is for supporting the display panel thereon.

20 Claims, 6 Drawing Sheets

BACKLIGHT STRUCTURE AND DISPLAY MODULE USING THE SAME

BACKGROUND OF THE INVENTION

1. Field of the Invention

The invention relates in general to a backlight structure and a display module, and more particularly to a backlight structure and a liquid crystal display (LCD) module.

2. Description of the Related Art

Display modules have been used in a variety of applications, such as lap-top computers, mobile phones, or personal digital assistants. For current and next generation of mobile applications, there is a strong demand for reducing the outline size of a display module while keeping a certain screen size thereof.

To meet this demand, the dead border is an important factor to be considered. Unlike the active area of a display module, the dead border is usually an area incapable of displaying, and sometimes is referred to as a dead area. The dead border is the area from outer edges of the active area towards the outline or outer edges of the display module. The active area and dead border together determine the outline size of the display module. Thus, in a case where certain active area is required, the dead border, or the dead area, of a display module determines the outline size of itself.

Various efforts have been made for reducing the dead border. For example, the dead border can be reduced by making the components of an display module smaller, such as by narrowing the width of a metallic frame which serves as an outer frame for a display panel, by reducing the size of a holder which supports the display panel, or by reducing the size of a backlight unit which provides light to the display panel.

However, there are some limitations in the abovementioned means. For example, reducing the component size of a display module may encounter problems in machining process, as well as in the rigidity or strength of the display module. In view of these limitations, it is possible that the components of a display module are at their allowable minimal sizes but the dead border of the display module is still too large to meet user's demand. Therefore, it is still an important issue for industry endeavors to reduce the dead border for a display module.

SUMMARY OF THE INVENTION

The invention is directed to a backlight structure and a display module, resulting in a narrow dead border for the display module.

According to an aspect of the present invention, a backlight structure is provided. The backlight structure includes a backlight unit and a casing. The backlight unit provides light to a display panel. The casing has a base portion and a support portion. The base portion surrounds the backlight unit. The support portion is connected to the base portion, and overlaps with part of the backlight unit. The support portion is for supporting the display panel thereon.

According to another aspect of the present invention, a display module is provided. The display module includes a display panel, a backlight unit, and a casing. The backlight unit provides light to the display panel. The casing has a base portion and a support portion. The base portion surrounds the backlight unit. The support portion is connected to the base portion, and overlaps with part of the backlight unit. The support portion is for supporting the display panel thereon.

The above and other aspects of the invention will become better understood with regard to the following detailed description of the preferred but non-limiting embodiment(s). The following description is made with reference to the accompanying drawings.

DETAILED DESCRIPTION OF THE INVENTION

A backlight structure and a display module are provided in a number of exemplary embodiments as follows. In an embodiment, the backlight structure has a backlight unit whose edges are overlapped with a casing used for supporting a display panel, so that the distance from the edges of active area to the corresponding edges of the display module can be reduced. In this way, the backlight structure and the display module can be implemented as having a narrow dead border. Besides, the overlap between the casing and the edges of the backlight unit prevents optical artifact at the edges of the backlight unit. Further description is provided as follows with reference to accompanying drawings.

Figure 1A:
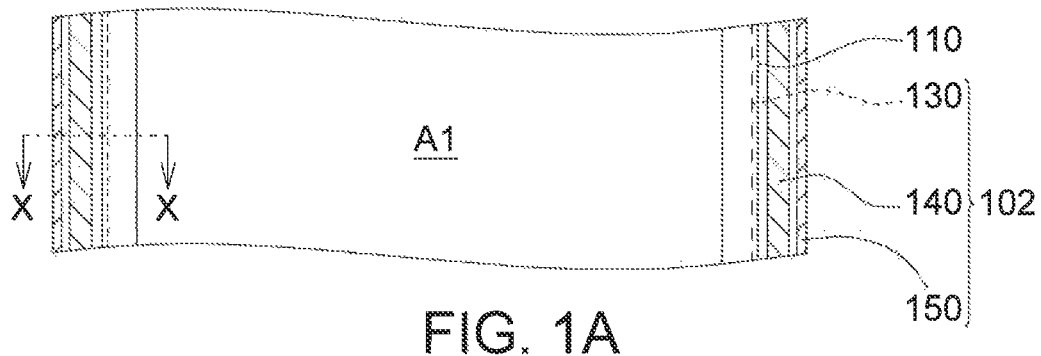
FIG. 1A is a schematic diagram showing an example of a plan view of a display module.

FIG. 1A is a schematic diagram showing an example of a plan view of a display module. In this example, the display module 10 includes a display panel 110, and a backlight structure 102. The display panel 110 is for example a liquid crystal display panel or a touch panel. The backlight structure 102 includes a backlight unit 130, a casing 140 and a metal frame 150. The backlight unit 130 is for providing light to the display panel 110, and is under the display panel 110, thus being shown in dashed line. The casing 140 serves as a holder for supporting the display panel 110 thereon. The casing 140 can be for example made of plastic, resin, or other material known in the art. The metal frame 150 servers as a chassis for protecting the display panel 110 or other component of the display module 10 from damage.

Figure 1B:
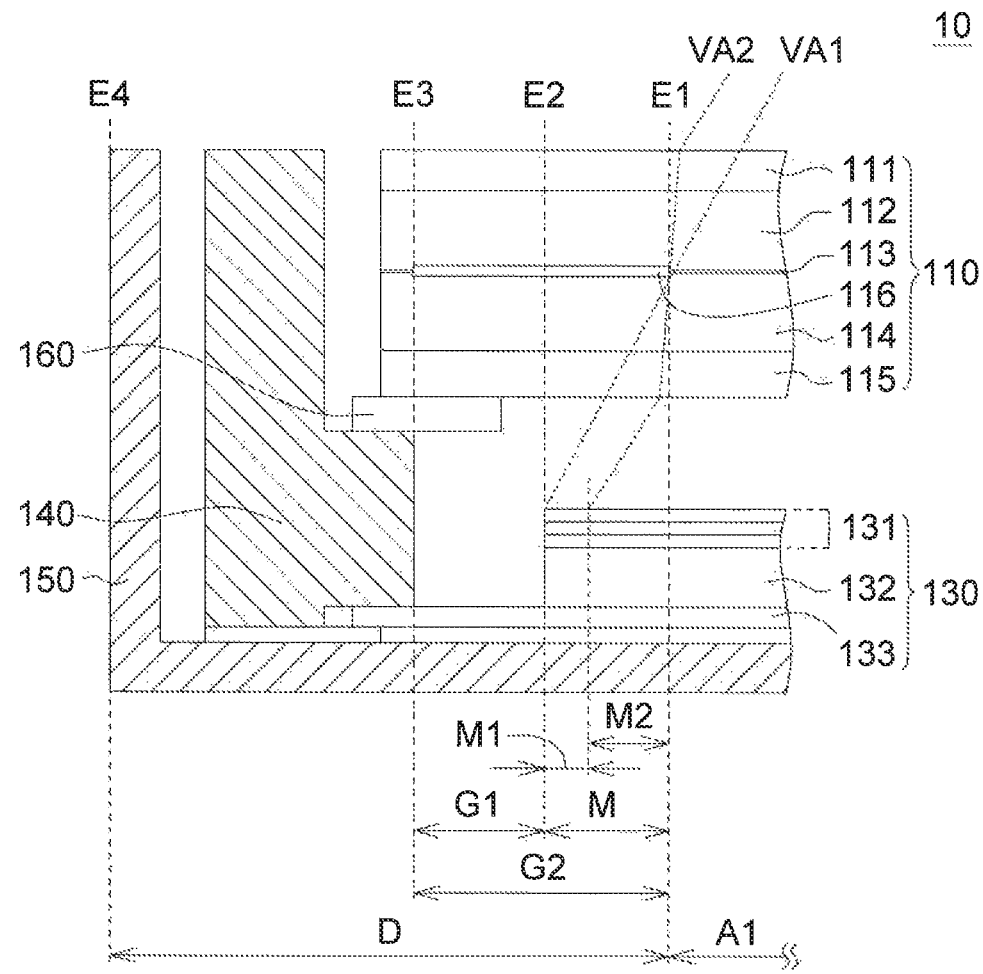
FIG. 1B is a schematic diagram showing an example of a sectional view of the display module in FIG. 1A, wherein the sectional view is taken along a line X-X thereof.

FIG. 1B is a schematic diagram showing an example of a sectional view of the display module in FIG. 1A, wherein the sectional view is taken along a line X-X thereof.

The display panel 110 includes a top polarizing plate 111, an upper substrate 112, a display material layer 113, a lower substrate 114, a back polarizing plate 115, and a seal 116. The top polarizing plate 111 and the back polarizing plate 115 are respectively disposed on the upper substrate 112 and the lower substrate 114, while the display material layer 113 is disposed between the two substrates 112 and 114. The seal 116 is disposed on the surround of the two substrates 112 and 114, forming an internal space therebetween for filling display material layer 113 and preventing it from leakage.

The backlight unit 130 includes at least one optical film 131, a light guide 132, and a reflector film 133. Take a number of optical films 131 for example. The optical films 131 are where the light of the backlight unit 130 is emitted. The optical films 131 has a number of edges, such as an edge E2 from the sectional view of FIG. 1B. The optical films 131 include, for example, diffusing sheets and prism sheets. The light guide 132 is disposed between the optical film 131 and the reflector film 133. The reflector film 133 reflects the light traveling downward from the light guide 132 and causes it to travel toward the display panel 110. The display panel 110 is bonded to the casing 140 through a double-side adhesive (DSA) layer 160.

There are several parameters related to the outline size of the display module 10. Among them, some are illustrated with labels, such as an edge E1 of the active area A1, an edge E2 of the optical films 131, an inner edge E3 of the casing 140, and an outer edge E4 of the metal frame 150. In addition, there are a length M between the edges E1 and E2, a gap G1 between the edges E2 and E3, a gap G2 between the edges E3 and E1, and a distance D between the edges E1 and E4.

In order to reduce the outline size of the display module 10 while keep a certain screen size thereof, the dead border of the display module 10 is an important factor. In FIG. 1A, the dead border is the area from outer edges of the active area A1 of the display panel 110 towards the outline or outer edges of the display module 10. More specifically, as shown in FIG. 1B, the dead border of the display module 10 is determined by the distance D from the edge E1 of the active area A1 to the edge E4 of the metal frame 150. As such, if the distance D can be shortened, the display module 10 can have a narrower dead border.

It is found that the backlight structure of the display module 10 in FIG. 1B has limitations on shortening the distance D. Among them, one limitation regards the distance M from the edge E1 of the active area A1 to the edge E2 of the optical films 131. In the example of FIG. 1B, the distance M is a combination of lengths M1 and M2. In addition to the length M2 for a certain view angle denoted by dashed line VA2, the length M1 is an additional dimension with which the edge E2 of the optical films 131 can be prevented from being observed by users, as denoted by dashed line VA1. Moreover, between the inner edge E3 of the casing 140 and the edge E2 of the optical films 131, an appropriate gap G1 also is required. In view of the distance M and the gap G1, they are regarded as a requirement or limitation as to shortening the distance D, which makes it difficult to decrease the dead border.

Figure 2A:
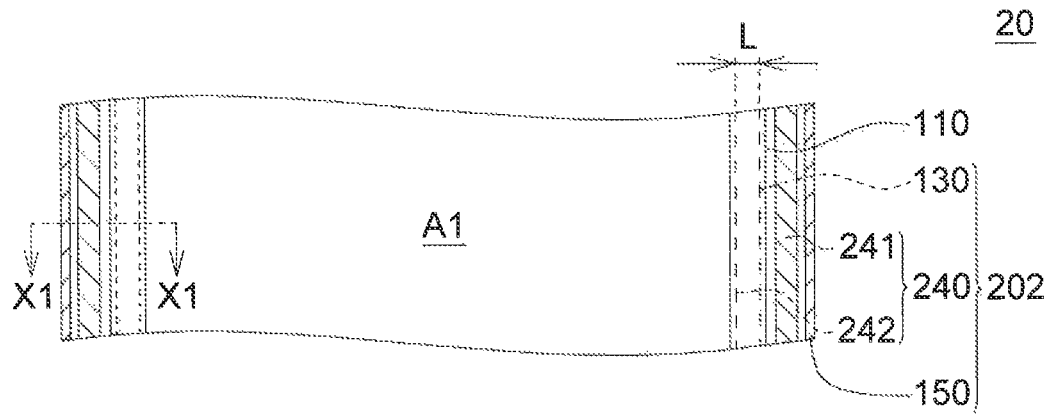
FIG. 2A is a schematic diagram showing an example of a plan view of a display module according to an embodiment of the invention.

FIG. 2A is a schematic diagram showing an example of a plan view of a display module according to an embodiment of the invention. In this example, the display module 20 differs from the display module 10 in a different backlight structure 202 of the display module 20. The backlight structure 202 has a casing 240 which is overlapped with part of the backlight unit 130. Thus, there is an overlap L between the casing 240 and the backlight unit 130, as shown in FIG. 2A.

Figure 2B:
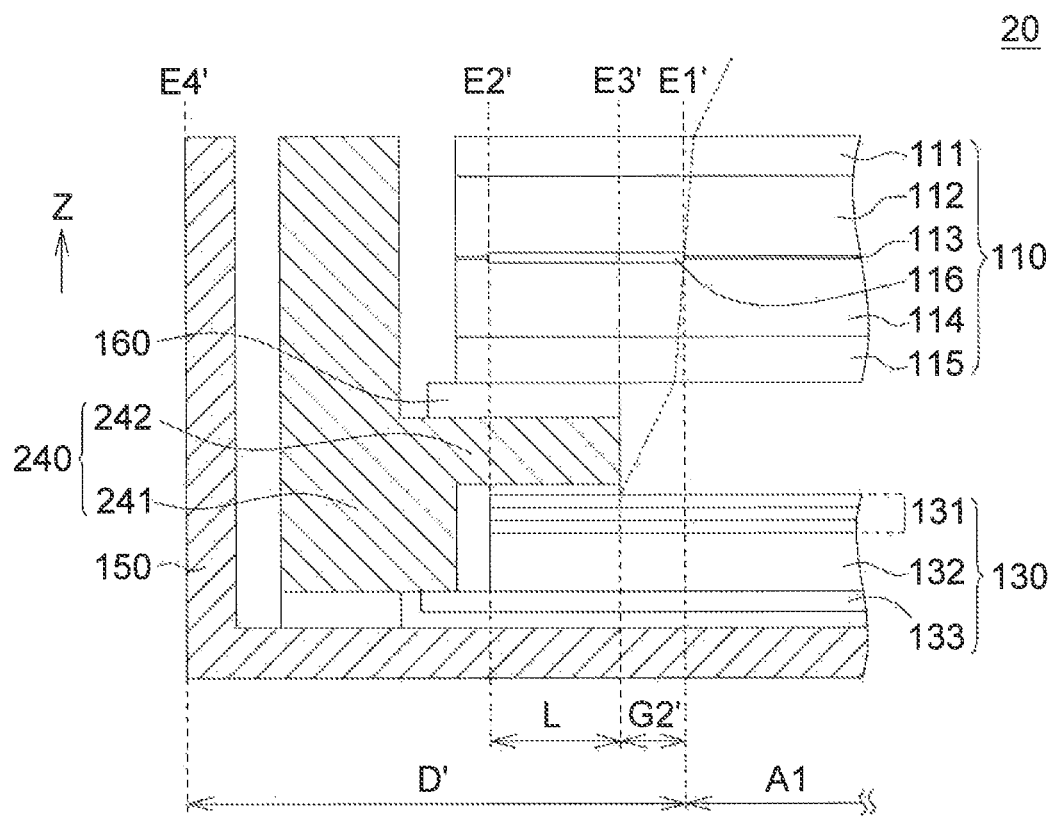
FIG. 2B is a schematic diagram showing an example of a sectional view of the display module in FIG. 2A, wherein the sectional view is taken along a line X1-X1 thereof.

FIG. 2B is a schematic diagram showing an example of a sectional view of the display module in FIG. 2A, wherein the sectional view is taken along a line X1-X1 thereof. More specifically, the casing 240 has a base portion 241 and a support portion 242. The base portion 241 surrounds the backlight unit 130. The support portion 242 is used to support the display panel 110 thereon. The support portion 242 is connected to the base portion 241. For example, the support portion 242 is extended from the base portion 241 towards the edge E1' or the active area A1. In this embodiment, the support portion 242 can be made of same materials as that of the base portion 241, and can be made by injection molding.

Figure 2C:
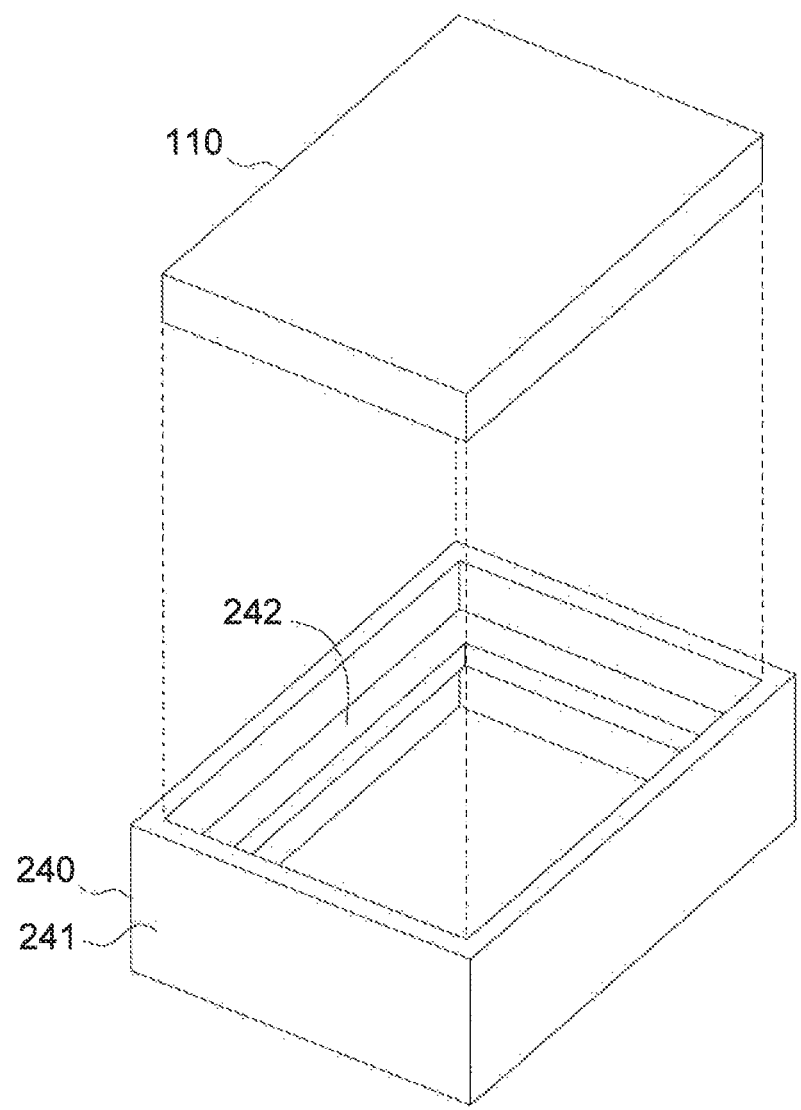
FIG. 2C is an exploded diagram of a portion of the display module in FIG. 2A.

The support portion 242 overlaps with part of the backlight unit 130. For example, FIG. 2C shows an exploded diagram of a portion of the display module 20 is shown. As can be seen from FIG. 2C, the upper surface of the support portion 242 is of rectangle ring shape. With this shape, the support portion 242 can be used to cover the edges of the backlight unit 130. Covering or overlapping means that support portion 242 can be disposed over or above the backlight unit 130, and separated from the backlight unit 130 by an air-gap in Z-direction Z of thickness so that edges of the backlight unit 130 are covered by the support portion 242.

There are several parameters related to the outline size of the display module 10. Among them, some are illustrated with labels, such as an edge E1' of the active area A1, an edge E2' of the optical films 131, an inner edge E3' of the casing 240, and an outer edge E4' of the metal frame 150. In addition, there are an overlap L between the edges E2' and E3', a gap G2' between the edges E3' and E1', and a distance D' between the edges E1' and E4'.

In this embodiment, overlapping with part of the backlight unit 130 not only reduce the area of the dead border of the display module 20, but also prevents the visibility of the edge E2' of the optical films 131. As compared with the display module 10 in FIG. 1B where the backlight unit 130 prevents the visibility of the edge of the optical films 131 by using additional length M (M=M1+M2), the display module 20 in FIG. 2B prevents the visibility of the edge E2' of the optical films 131 by the overlap between the casing 240 and the backlight unit 130. As regards a gap G2' between the inner edge E3' of the casing 240 and the edge E1' of the active area A1, the display module 20 can have a smaller gap G2' comparing with the length M. Thus, the display module 20 has a smaller distance D' than the distance D of the display module 10. Therefore, the display module 20 can be implemented as having a narrow dead border, which is defined by distance D'.

Figure 3A:
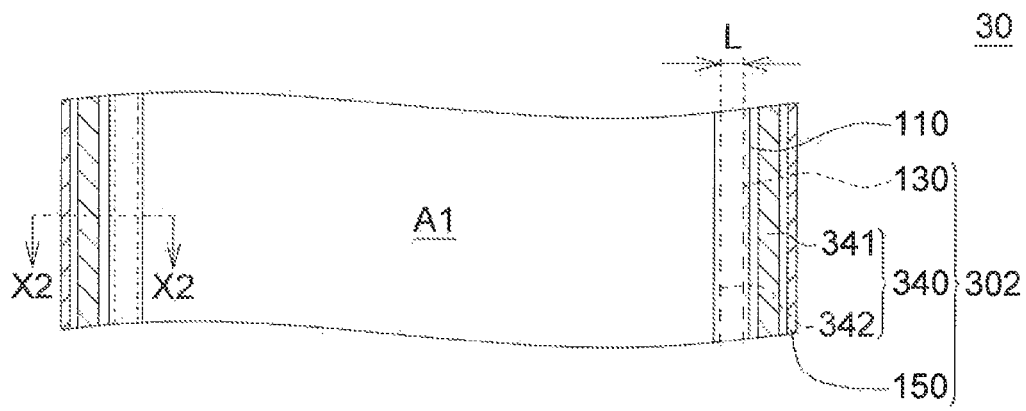
FIG. 3A is a schematic diagram showing an example of a plan view of a display module according to an embodiment of the invention.
Figure 3B:
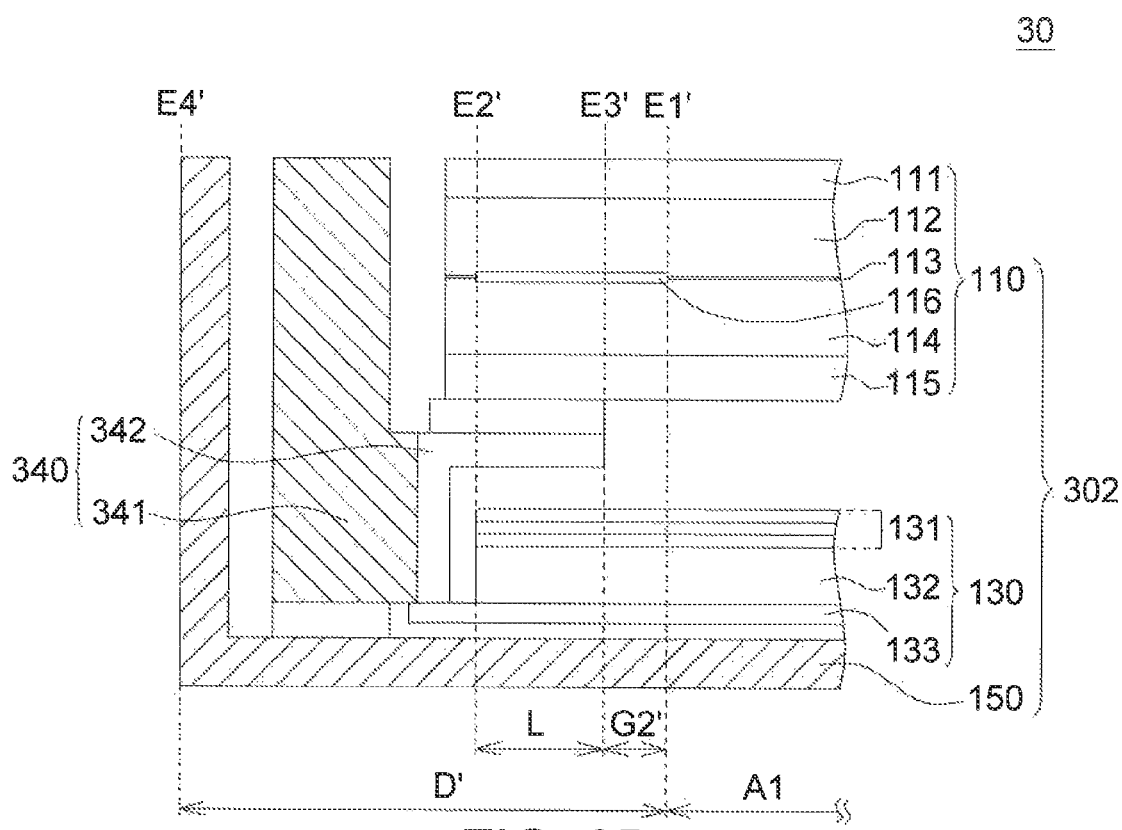
FIG. 3B is a schematic diagram showing an example of a sectional view of the display module in FIG. 3A, wherein the sectional view is taken along a line X2-X2 thereof.

FIG. 3A is a schematic diagram showing an example of a plan view of a display module according to an embodiment of the invention. FIG. 3B is a schematic diagram showing an example of a sectional view of a display module in FIG. 3A according to another embodiment of the invention. The sectional view in FIG. 3B is taken along a line X2-X2 from an display module 30 in FIG. 3A.

As is similar to that in FIG. 2B, the display module 30 of this embodiment has a backlight structure 302. The backlight structure 302 has a casing 340 which has a base portion 341 and a support portion 342. In addition, the support portion 342 is connected to the base portion 241, and overlaps with part of the backlight unit 130, which not only improves the dead border of the display module 30, but also prevents the visibility of the edge E2' of the optical films 131.

The display module 30 differs from the display module 20 in FIG. 2B in that the base portion 341 and the support portion 342 can be made of different materials. In this embodiment, the support portion 342 is for example of metal. More specifically, the support portion 342 can be a metal frame made by insert molding, and molded to a lateral side of the base portion 341, as shown in FIG. 3B. As can be observed from the cross-section view in FIG. 3B, the metallic support portion 342 is an L-shape metal frame in this example.

The metallic support portion 342 can result in a reduced thickness of the display module 30. As compared with the display module 20 in FIG. 2B where the support portion 242 used to support the display panel 110 is made of injection molding materials such as resin, the metallic support portion 342 is stronger and more rigid. Thus, the support portion 342 can have a thinner thickness than that of the support portion 242. Therefore, the display module 30 can be implemented as having a reduced thickness.

Figure 4A:
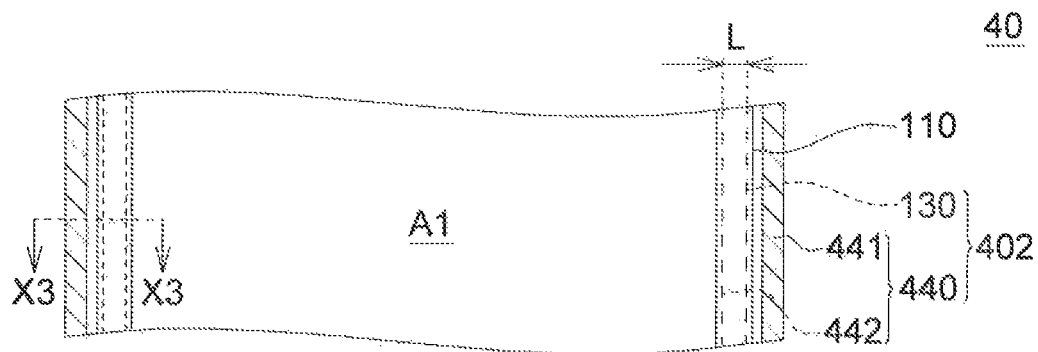
FIG. 4A is schematic diagram showing an example of a plan view of a display module according to another embodiment of the invention.
Figure 4B:
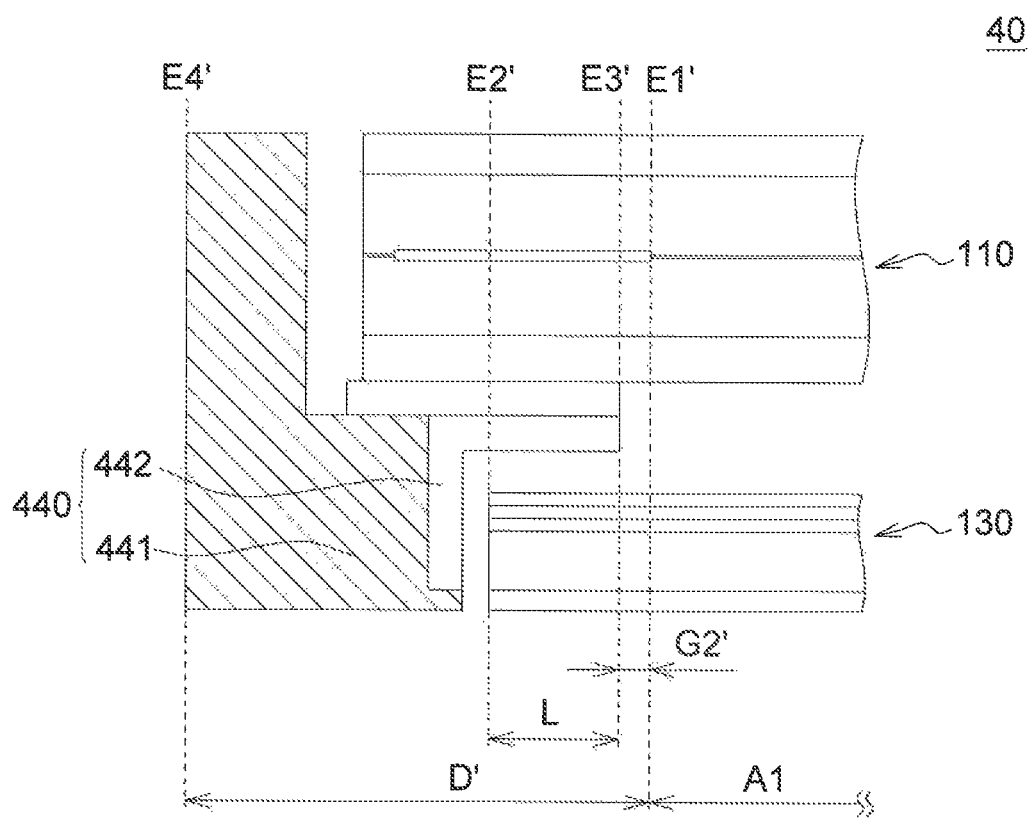
FIG. 4B is a schematic diagram showing an example of a sectional view of the display module in FIG. 4A, wherein the sectional view is taken along a line X3-X3 thereof.

FIG. 4A is a schematic diagram showing an example of a plan view of a display module according to another embodiment of the invention. FIG. 4B is a schematic diagram showing an example of a sectional view of the display module in FIG. 4A, wherein the sectional view is taken along a line X3-X3 thereof. As is similar to other embodiments, the display module 40 has a backlight structure 402. The backlight structure 402 has a casing 440 which has a base portion 441 and a support portion 442. In this example, the display module 40 differs from the display module 30 in that the metal frame 150 is not included, and the display panel 110 overlaps not only the base portion 441 but the metallic support portion 442, as shown in FIG. 4B. In this way, the casing 440 can have an enhance strength in supporting. In this embodiment, the display module 40 can also be implemented as having a narrow dead border, as well as a reduced thickness.

Figure 5A:
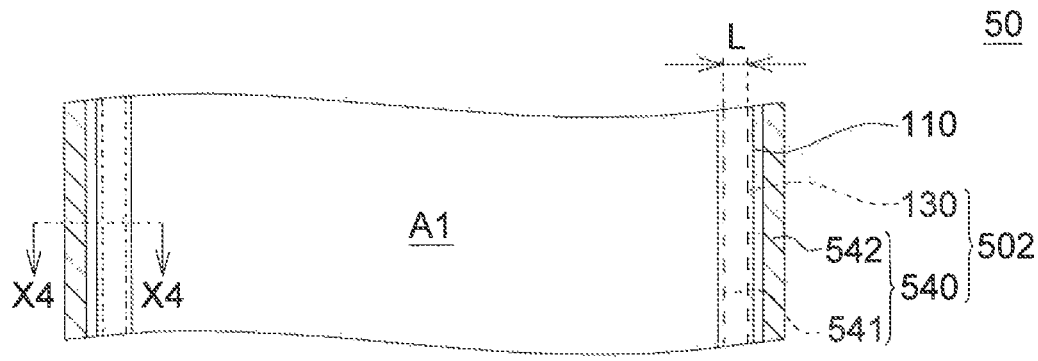
FIG. 5A is schematic diagram showing an example of a plan view of a display module according to another embodiment of the invention.
Figure 5B:
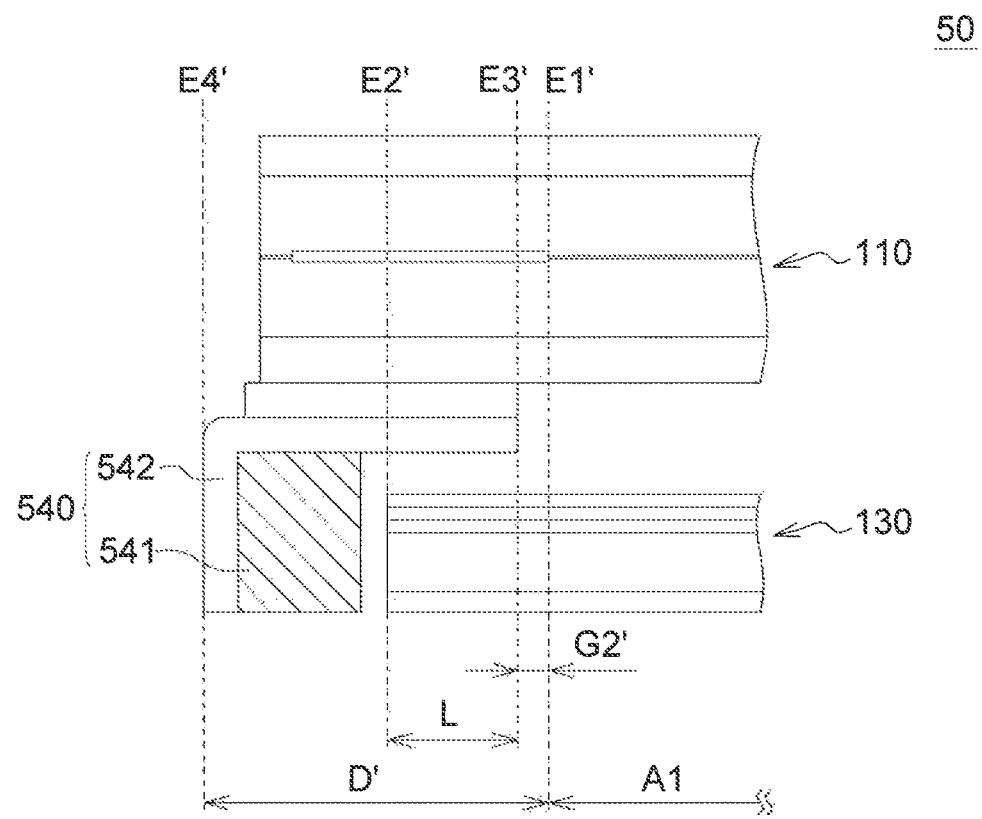
FIG. 5B is a schematic diagram showing an example of a sectional view of the display module in FIG. 5A, wherein the sectional view is taken along a line X4-X4 thereof.

FIG. 5A is a schematic diagram showing an example of a plan view of a display module according to another embodiment of the invention. FIG. 5B is a schematic diagram showing a sectional view of the display module in FIG. 5A, wherein the sectional view is taken along a line X4-X4 thereof. As is similar to other embodiments, the display module 50 has a backlight structure 502. The backlight structure 502 has a casing 540 which has a base portion 541 and a support portion 542. In this example, the display module 50 differs from the display module 40 in that the metallic support portion 542 is at the outline of the display module 50. The metallic support portion 542 is strong, rigid, and can be used for protecting the display module 50 from damage. The support portion 542 can be disposed above the base portion 541, and extended from an upper side of the base portion 541, as shown in FIG. 5B. In this embodiment, the display module 50 can also be implemented as having a narrow dead border, as well as a reduced thickness.

According to the backlight structure and the display module disclosed in the embodiment of the invention, the backlight unit has its edges overlapped with the casing used for supporting the display panel. In this way, the distance from the edges of active area to the corresponding edges of the display module can be reduced. Therefore, the display module can be implemented as having a reduced dead area, and the topical artifacts caused by the edges of the optical films can be avoided. In an embodiment, in addition to a function of supporting the display panel thereon, the metallic support portion can further enhance the strength of the support portion and reduce the thickness of the display module.

While the invention has been described by way of example and in terms of the preferred embodiment(s), it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A backlight structure comprising:
   a backlight unit for providing light to a display panel, the backlight unit comprising an optical film; and
   a casing having a base portion and a support portion, the base portion surrounding the backlight unit, the support portion being connected with the base portion and overlapping part of the backlight unit, the support portion being adapted for supporting the display panel thereon;
   wherein the display panel is disposed above the support portion, and the optical film is disposed below the support portion,
   wherein the support portion is disposed at an outside of the base portion, an edge of the display panel is between an edge of the backlight unit and the support portion, and a first gap between an edge of an active area of the display panel and an inner edge of the casing is smaller than a second gap between an edge of the optical film and the inner edge of the casing,
   wherein an upper side of the base portion and that of the support portion are below the display panel.

2. The backlight structure according to claim 1, wherein the upper surface of the support portion is of a rectangular ring shape and the support portion covers the edges of the backlight unit.

3. The backlight structure according to claim 1, wherein the light of the backlight unit is emitted from the optical film, the optical film has a plurality of edges, and the edges of the optical film are covered by the support portion.

4. The backlight structure according to claim 3, wherein the backlight unit further comprises a light guide and a reflector film, and the light guide is disposed between the optical film and the reflector film.

5. The backlight structure according to claim 1, wherein the support portion is of metal.

6. The backlight structure according to claim 1, wherein the support portion is a metal frame made by insert molding.

7. The backlight structure according to claim 1, wherein the support portion is extended from a lateral side of the base portion.

8. The backlight structure according to claim 1, wherein the support portion is extended from the upper side of the base portion.

9. The backlight structure according to claim 1, wherein the display panel is bonded to the casing through a double-side adhesive layer, and an outer edge of the double-side adhesive layer is between the edge of the display panel and an outer edge of the casing.

10. A display module comprising:
    a display panel;
    a backlight unit for providing light to the display panel, the backlight unit comprising an optical film; and
    a casing having a base portion and a support portion, the base portion surrounding the backlight unit, the support portion being connected with the base portion and overlapping part of the backlight unit, the support portion being adapted for supporting the display panel thereon;
    wherein the display panel is disposed above the support portion, and the optical film is disposed below the support portion,
    wherein the support portion is disposed at an outside of the base portion, an edge of the display panel is between an edge of the backlight unit and the support portion, and a first gap between an edge of an active area of the display panel and an inner edge of the casing is smaller than a second gap between an edge of the optical film and the inner edge of the casing,
wherein an upper side of the base portion and that of the support portion are below the display panel.

11. The display module according to claim 10, wherein the upper surface of the support portion is of a rectangular ring shape and the support portion covers the edges of the backlight unit.

12. The display module according to claim 10, wherein the light of the backlight unit is emitted from the optical film, the optical film has a plurality of edges, and the edges of the optical film are covered by the support portion.

13. The display module according to claim 12, wherein the backlight unit further comprises a light guide and a reflector film, and the light guide is disposed between the optical film and the reflector film.

14. The display module according to claim 10, wherein the support portion is of metal.

15. The display module according to claim 10, wherein the support portion is a metal frame made by insert molding.

16. The display module according to claim 10, wherein the support portion is extended from a lateral side of the base portion.

17. The display module according to claim 10, wherein the support portion is extended from the upper side of the base portion.

18. The display module according to claim 10, wherein the display panel is a liquid crystal display panel.

19. The display module according to claim 10, wherein the display panel is a touch panel.

20. The display module according to claim 10, wherein the display panel is bonded to the casing through a double-side adhesive layer, and an outer edge of the double-side adhesive layer is between the edge of the display panel and an outer edge of the casing.

* * * * *